Figure 1:
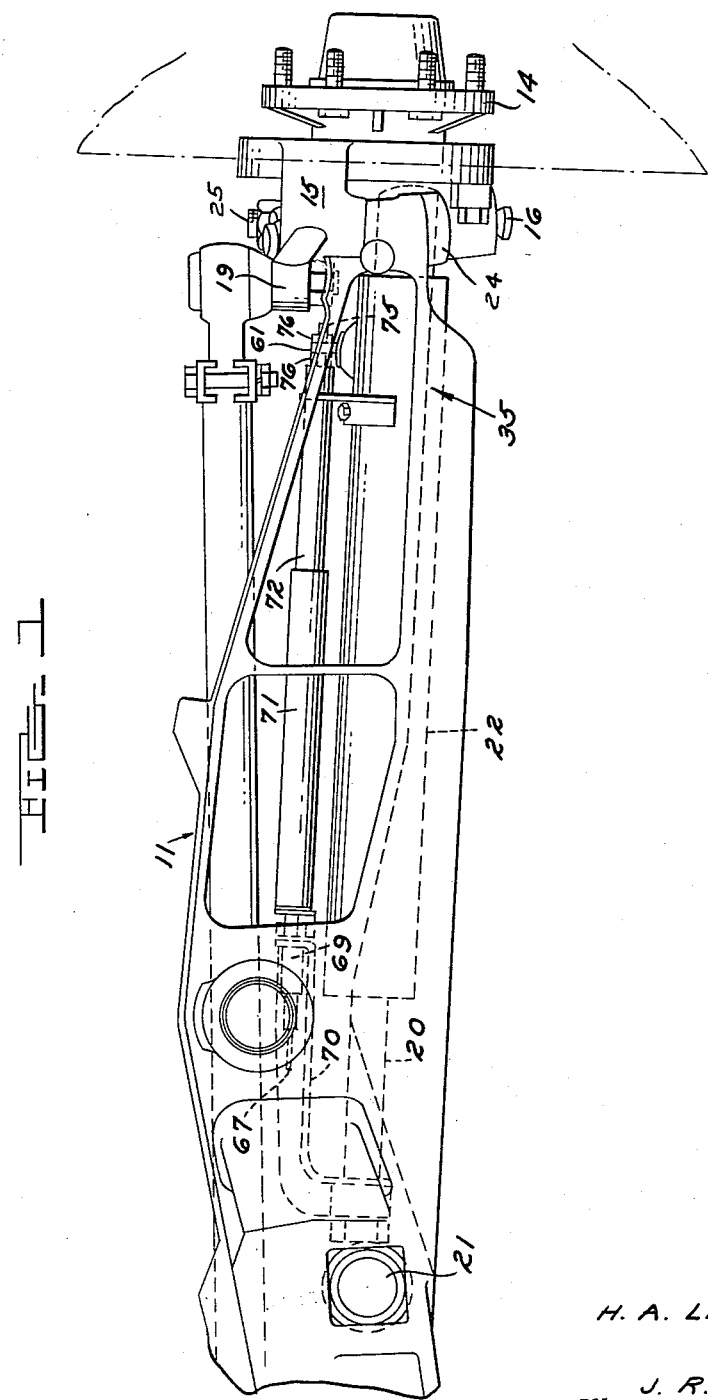

March 3, 1964 H. A. LEHMANN 3,122,973
HYDRAULIC POWER STEERING APPARATUS
Filed June 4, 1959 2 Sheets-Sheet 1

H. A. LEHMANN
INVENTOR.

BY J. R. FAULKNER
P. F. HILDER

ATTORNEYS

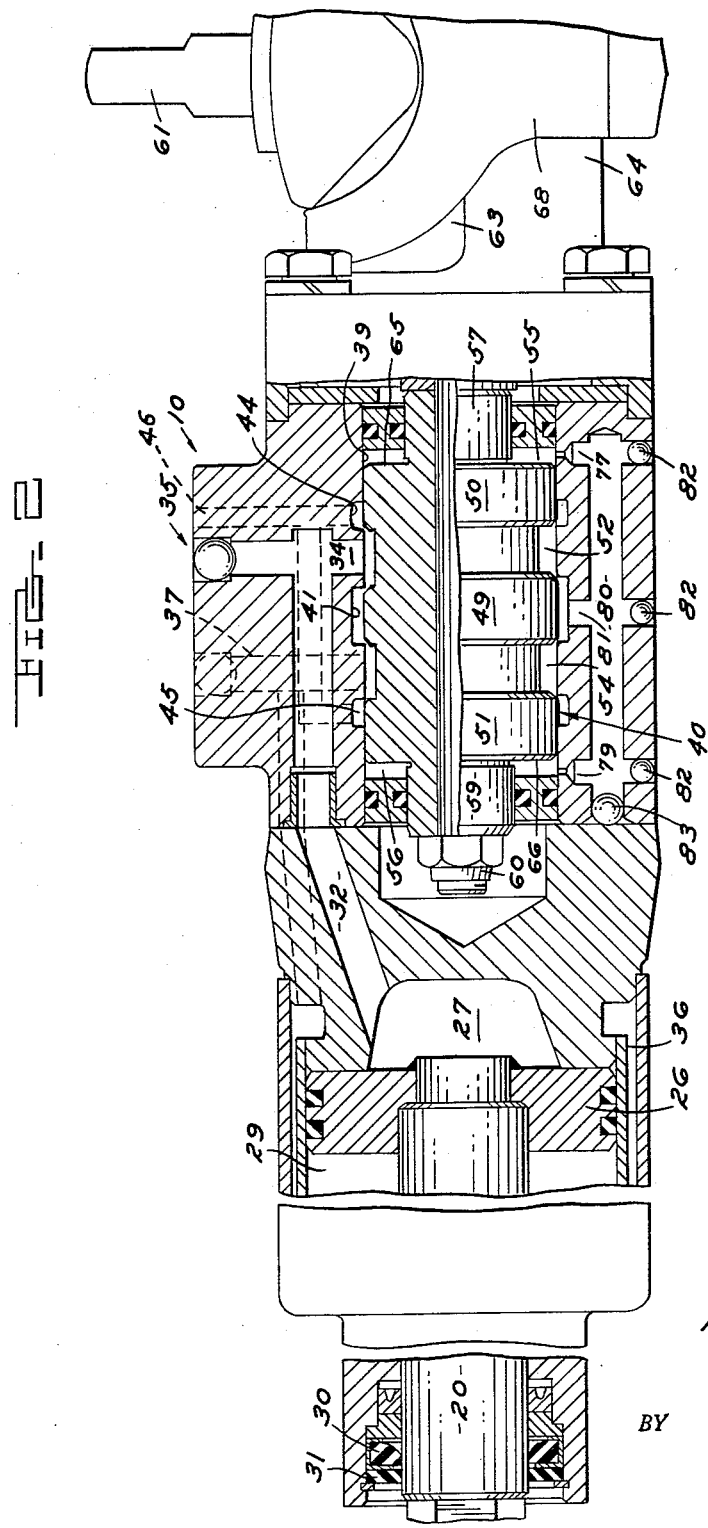

United States Patent Office 3,122,973
Patented Mar. 3, 1964

3,122,973
HYDRAULIC POWER STEERING APPARATUS
Harold A. Lehmann, Oak Park, Mich., assignor to Ford Motor Company, Dearborn, Mich., a corporation of Delaware
Filed June 4, 1959, Ser. No. 818,123
8 Claims. (Cl. 91—434)

This invention relates to power steering mechanisms for wheel type vehicles, including tractors.

Vehicle power steering mechanisms of the hydraulic type are comprised of a hydraulic cylinder or other expansible chamber motor connected with the steering mechanism of the vehicle for steering the wheels in response to movement of the steering wheel. The cylinder is operated from a source of hydraulic fluid under pressure which may consist of a power steering pump, hydraulic accumulator, or other source of fluid under pressure.

Flow of hydraulic fluid to and from the hydraulic motor or cylinder is controlled by a valve operated by turning of the steering wheel. The valve may be located at one end of the hydraulic cylinder, or may be separate from the cylinder and associated with the steering mechanism near the cylinder as in MacDuff Patent No. 2,757,748. The valve for controlling flow of fluid to the power steering cylinder, which is usually of the spool valve type as shown in the MacDuff patent, is acted on by both the steering wheel of the vehicle and by the position of the wheels, movement of the steering wheel opening the valve and corresponding movement of the steered wheels recentering the spool to close the valve. This action, which is known as "follow-up" normally is obtained by moving the valve body responsive to movement of the steering linkage associated with the steered wheels.

In most power steering systems, including that shown in the MacDuff patent, a more or less rigid mechanical steering linkage is provided between the steering wheel and the steered wheels of the vehicle, the mechanical linkage providing the minor portion of the effort required to steer the vehicle as well as the effort to operate the valve, and the hydraulic system providing the major part of the effort.

The present invention relates to a power steering mechanism of the "100 percent" type in which the steering effort required bears no relation to the force required to steer the vehicle but is more or less uniform, being determined only by the friction in the linkage. Preferably, the steering control consists of a push-pull cable linkage which may be actuated by a conventional steering wheel and shaft, the linkage being incapable of transmitting sufficient force, operating alone, to steer the vehicle but transmitting sufficient force to operate the control valve.

In a power steering control valve of the type above described, it is desirable that, in the steering of the vehicle, the control spool be displaced in the proper direction for steering the vehicle and then returned directly to the neutral position, in which fluid under pressure is not admitted to either end of the hydraulic cylinder. In control valves of the type disclosed in the MacDuff patent in which a steering "feel" is obtained, hydraulic pressure on the spool tending to move it in an axial direction is in more or less direct relation to the force required to steer the vehicle, and the control spool is acted on in one direction by the manually operated steering controls and in the other direction by a hydraulic force proportional to the steering effort required. As steering movement is completed, both of these forces decreases together, permitting the spool to return to neutral position without oscillation. However, in valves of this general type when used in "100 percent" power steering installations, the valve spool, when returning to neutral, tends to "hunt" or overtravel, oscillating back and forth beyond the neutral position, producing oscillation or shimmy of the dirigible wheels.

According to the present invention, restricted vent passages for the chambers at each end of the valve spool are provided, the passages being large enough to prevent unequal buildup of pressure in the chambers during operation of the valve but sufficiently small to dampen hunting or oscillation of the spool, whereby the spool, after a steering movement is completed, will return directly to and remain in the neutral position until again actuated.

Among the objects of the present invention are to provide an improved control valve for power steering systems of the "100 percent" type; to provide such a valve in which oscillation of the control spool is dampened to prevent overtravel; and generally to improve valves of the type described. Other objects and objects relating to details and economies of manufacture and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent wtih the context and with the concept of my invention as distinguished from the pertinent prior art. The best form in which I have contemplated applying my invention is illustrated in the accompanying drawings forming part of this specification in which:

FIGURE 1 is a front elevation of a portion of the front axle assembly, the right end of the assembly being broken away for convenience of illustration; and FIGURE 2 is an enlarged elevation of the hydraulic cylinder and control valve assembly, portions of the cylinder and valve being shown in axial section.

Referring now to FIGURE 1, the hydraulic power steering cylinder assembly 10 of the present invention is shown in conjunction with a more or less conventional front axle assembly including an axle 11 which rotatably mounts two dirigible wheels (not shown). Each wheel is carried on a hub 14 rotatably mounted on a spindle body 15 which is carried on a generally vertically extending king bolt 16 mounted on each end of the axle. The wheels are joined for simultaneous steering on the axle 11 by a tie rod 17 which is attached to a steering arm 19 fixed to the spindle body 15.

The power steering cylinder assembly 10 extends between the axle 11 and a steering arm 19, the cylinder extending generally parallel to the length of the axle. The projecting end of the piston rod 20 of the cylinder is pivotally connected to the axle by a pin 21 permitting limited swinging of the piston rod on the axle as the cylinder assembly 10 is actuated.

In the type of power steering assembly shown, the control valve is integral with the cylinder body 22, being received within the end portion of the cylinder body. The cylinder body 22 is provided with a projecting eye 24 which is pivotally connected to the steering arm 19 by a pin 25. When hydraulic fluid under pressure is admitted to the cylinder body 22, it serves to move the cylinder body along the piston rod in one direction or the other so as to increase or decrease the distance between the pins 21 and 25 and thus steer the vehicle. The assembly shown in FIGURE 1 and described above is generally conventional.

The cylinder body 22 receives a piston 26 secured to the inner end of the piston rod 20, the cylinder being double-acting and provided with chambers 27 and 29 at opposite sides of the piston. The end of the cylinder from which the rod 20 extends is provided with an O ring 30 and a wiper 31, the O ring serving to seal around the rod and prevent the escape of hydraulic fluid. The opposite end of the cylinder is closed.

A passage 32 extends from the chamber 27 to a passage 34 within a valve body 35 at the end of the cylinder assembly. Similarly, a passage 36 connects the chamber 29 with a passage 37 within the valve body 35.

The valve body 35 is provided with a central bore 39 which closely receives a spool 40. The passages 34 and 37 extend inwardly to intersect the bore at two locations spaced axially along its length. The bore is provided with a centrally-located, circumferential groove 41 which is connected with the return port (not shown) of the valve body and a pair of grooves 44 and 45 connected with a pressure port 46 for receiving oil under pressure. The grooves 44 and 45 preferably are spaced at equal intervals on either side of the groove 41, and the passages 34 and 37 leading to the cylinder are located one on each side of the central groove 41.

The spool 40 is provided with a central land 49 and end lands 50 and 51, separated by a pair of grooves 52 and 54. The lands 49, 50, and 51 fit very closely within the bore 39 of the valve body so as to minimize leakage across the lands, the leakage being on the order of one-third of a gallon of hydraulic fluid per minute at a pressure of 750 pounds per square inch, and 65 SUS viscosity oil.

The bore 39 of the valve body extends beyond the end lands 50 and 51 of the spool, the spool having an endwise movement preferably on the order of .060 of an inch in each direction from a centered position with respect to the grooves 41, 44 and 45 on the surface of the bore. The extra length of the bore provides chambers 55 and 56 at each end of the spool 40, the chambers being formed in part by surfaces of the spool and in part by surfaces of the valve body. Axially-extending portions 57 and 59, extending from the ends of the spool 40 and much smaller in diameter than the lands 50 and 51, are received within reduced extensions of the bore 39, the joints being sealed by O rings. A rod 60 extends axially of the spool 40 to connect the spool with a control stud 61 projecting radially near the pin 25 of the cylinder assembly 10. The stud 61 is capable of limited longitudinal movement within a slot (not shown) located within an extension 64 of the valve body 35, movement of the control stud 61 lengthwise of the cylinder assembly imparting a corresponding movement to the spool 40 through the rod 60. The slot is covered by an arcuate plate 63 surrounding the stud 61 and held in place by a strap 68 clamped about the valve body 35.

The steering controls for the vehicle preferably comprise a push-pull cable linkage which may be of the Teleflex type, in which a relatively stiff central control cable 67 operates within a rigid sheath 69 to transmit to the control stud 61 motion from the steering controls at the operator station (not shown). Referring now to FIGURE 1 the lower end of the sheath 69 is anchored to the piston rod 20 by a bracket 70, the sheath projecting within a pair of telescoping protective tubes 71 and 72, the tube 71 being supported from the end of the sheath 69 and the tube 72 being supported from a bracket 74 mounted on the outside of the valve body 35. The cable 67 terminates in a threaded rod 75 extending through the stud 61, the stud being clamped by a pair of nuts 76, 76. The control cable 67 may be operated by a wheel- or lever-type control, not shown.

The operation of the steering controls is such that as the cable 67 is actuated to move the stud 61 either to the left or right as viewed in FIGURE 1, the stud 61 will be moved to the left or right, actuating the valve spool 40 to operate the hydraulic cylinder assembly 10, the cylinder following the movement of the spool and stud so as to steer the wheels of the vehicle to the extent that the cable has been moved. As soon as movement of the cable is stopped, the cylinder will continue to operate to the extent necessary to center the spool 40 (neutral position), at which time the stud 61 will be positioned about midway of the slot.

In the centered position of the spool 40, the grooves 52 and 54 in the spool connect the pressure port 46 with both passages 34 and 37 in the valve body, maintaining limited pressure on both sides of the piston 26. They also overlap groove 41 so as to form a passage from grooves 44 and 45 to the oil return port.

When the control stud 61 is moved to the left as shown in FIGURE 2, the spool 40 is correspondingly displaced to the left to open wider the communication between the groove 45 and the passage 37 and to completely close the passage from the pressure groove 44 to the passage 34, which results in feeding oil under pressure to the chamber 29. At the same time, the groove 52 in the spool connects the passage 34 with the return oil groove 41 to permit oil to pass from the chamber 27 to the return oil port. Inasmuch as the end of the piston rod 20 is fixed to the axle, it results in moving the pin 25 and the entire cylinder body 22 to the left as viewed in FIGURE 2 until the spool 40 again becomes centered. Correspondingly, moving the spool 40 to the right as viewed in FIGURE 2 has the opposite effect so as to pressurize chamber 27 and move the cylinder body 22 and pin 25 to the right until the valve again becomes centered.

Inasmuch as the pressure oil grooves 44 and 45 are towards the ends of the spool 40 and the return oil groove 41 is midway of the length of the spool, the chambers 55 and 56 at the ends of the spool tend to be filled with oil at substantially the pressure within the grooves 44 and 45. The pressure within these chambers acts on the end or reaction surfaces 65 and 66 of the spool which in the valve of the present invention are of equal area. However, these pressures are more or less balanced when the spool is in neutral position, and the principal effect of the oil within these chambers is to oppose, in some degree, movement of the spool.

Upon moving the spool 40, the oil necessarily is displaced from the chamber at one end or the other of the spool, depending on which direction the spool is moved. In control valves of the type shown in the MacDuff patent above mentioned, the end chambers 55 and 56 are vented to the grooves 52 and 54, respectively, of the spool by metering passages (numbered 149 and 151 in the MacDuff patent) extending between the grooves in the spool and the end surfaces 65 and 66 of the spool so that when the spool is displaced towards one end of the body, the chamber at that end is connected with the pressure oil port through the groove 44 in the bore, and the chamber at the other end is vented to the return oil port through the groove 41 of the bore, thus producing an unbalance on the valve spool to give "feel" to the steering controls and indicate to the operator the power being required to steer the vehicle. Such a construction provides a passage for the oil trapped behind the spool 40, thus permitting the spool to return to neutral position.

When a control valve having the construction described immediately above is used with a steering system of the 100 percent power type, there is a tendency of the spool to "hunt" or overtravel when returning to the neutral position, moving past the neutral position first in one direction and then in the other due to the unbalanced pressures on the end surfaces 65 and 66 of the spool.

In the construction of the present invention, the passages connecting the grooves 52 and 54 of the spool with the ends of the spool are omitted, and the chambers 55 and 56 are vented to the oil return port at all times by a restricted passage which will retard or dampen the return movement of the spool 40, thus preventing overtravel and hunting. This is accomplished in the form shown in the present invention by passages 77 and 79 communicating with the chambers 55 and 56, respectively, the passages 77 and 79 being interconnected by an oil passage 80 which is connected to the oil return groove 41 of the bore by a passage 81. After machining, the outer ends of these passages may be plugged by pressing in a steel ball 82 or 83 as indicated in the drawings. The passages 77 and 79 are restricted adjacent the chambers 55 and 56, the size of the restricted portion of these passages being selected so that the passages will vent the oil under pressure leaking past the lands 50 and 51 of the spool so as to prevent any substantial buildup of pressure against the reaction surfaces 65 and 66. At the same time, the restricted portion of the passages 77 and 79 is sufficiently small so as to have a metering or dash-pot action on the oil in these chambers so as to resist free return of the spool 40 to neutral position, thus dampening movement of the spool and preventing overtravel. The actual size of the restricted portions of the passages 77 and 79 is dependent upon the amount of leakage across the lands 50 and 51, which, in turn, is dependent in part upon the fit of the spool 40 within the bore 39. It has been found that in a valve of the type shown and in which the clearance between the spool and bore is about four ten-thousandths (.0004) of an inch, and the hydraulic operating pressure on the pressure port is about 250 p.s.i.; the restricted portions of the passages 77 and 79 may have a diameter of about forty-thousandths (.040) of an inch, the pressure within the chambers 55 and 56 never rising above about 75 to 125 p.s.i.

In the construction of the present invention, the venting of the chambers 55 and 56 at all times prevents any substantial differential buildup of pressure in these chambers. If desired, the chambers 55 and 56 can be vented through the valve spool 40 rather than through the valve body 35, in which case passages leading through the interior of the spool from the reaction surfaces 65 and 66 can extend through the surface of the land 49 so as to communicate with the return oil groove 41 in the valve body at all times.

I claim:

1. In a power steering cylinder assembly of the type having an integral control valve and in which a valve spool is axially movable a short distance in either direction from a central neutral position within a valve body to operate a double acting cylinder, the spool having a series of lands and the valve body having a bore closely receiving the spool and provided with pressure oil and return oil passages and circumferential grooves coacting with the lands of the spool to direct oil under pressure selectively to one end or the other of the cylinder and to return oil from the opposite end of the cylinder, a pair of circumferential pressure-oil grooves being located one adjacent each end of the spool, and in which the valve body has a chamber at each end of the spool, the spool having reaction surfaces forming a portion of the walls of the chambers and there being appreciable leakage of oil from the pressure-oil grooves past the lands of the spool and into the chambers; the improvement which comprises: a restricted fluid passage venting each of the chambers to the return oil passage, the restricted passages being of such capacity as to maintain an equal pressure in said chambers substantially below operating oil pressure during operation of the valve spool and to restrict the passage of oil sufficiently to dampen oscillatory movement and prevent overtravel of the spool upon recentering.

2. In a power steering cylinder assembly of the type having an integral control valve and in which a valve spool is axially movable a short distance in either direction from a central neutral position within a valve body to operate a double acting cylinder, the spool having a series of lands and the valve body having a bore closely receiving the spool and provided with pressure oil and return oil passages and circumferential grooves coacting with the lands of the spool to direct oil under pressure selectively to one end or the other of the cylinder and to return oil from the opposite end of the cylinder, a pair of circumferential pressure-oil grooves being located one adjacent each end of the spool, and in which the valve body has a chamber at each end of the spool, the spool having reaction surfaces forming a portion of the walls of the chambers and there being appreciable leakage of oil from the pressure-oil grooves past the lands of the spool and into the chambers; the improvement which comprises: a restricted fluid passage located in the valve body and venting each of the chambers to the return oil passage, the restricted passages being of such capacity as to maintain an equal pressure in said chambers substantially below operating oil pressure during operation of the valve spool and to restrict the passage of oil sufficiently to dampen oscillatory movement and prevent overtravel of the spool upon recentering.

3. In a power steering cylinder assembly of the type having an integral control valve and in which a valve spool is axially movable a short distance in either direction from a central neutral position within a valve body to operate a double acting cylinder, the spool having a series of lands and the valve body having a bore closely receiving the spool and provided with pressure oil and return oil passages and circumferential grooves coacting with the lands of the spool to direct oil under pressure selectively to one end or the other of the cylinder and to return oil from the opposite end of the cylinder, a pair of circumferential pressure-oil grooves being located one adjacent each end of the spool, and in which the valve body has a chamber at each end of the spool, the spool having reaction surfaces forming a portion of the walls of the chambers and there being appreciable leakage of oil from the pressure-oil grooves past the lands of the spool and into the chambers; the improvement which comprises: a restricted fluid passage venting each of the chambers to the return oil passage, the restricted passages being on the order of 0.040 of an inch so as to maintain an equal pressure in said chambers during operation of the valve spool and to restrict the passage of oil sufficiently to dampen oscillatory movement and prevent overtravel of the spool upon recentering.

4. In a power steering cylinder assembly of the type having an integral control valve and in which a valve spool is axially movable a short distance in either direction from a central neutral position within a valve body to operate a double acting cylinder, the spool having a series of lands and the valve body having a bore closely receiving the spool and provided with pressure and return oil passages and circumferential grooves coacting with the lands of the spool to direct oil under pressure selectively to one end or the other of the cylinder and to return oil from the opposite end of the cylinder, a pair of circumferential pressure-oil grooves being located one adjacent each end of the spool, and in which the valve body has a chamber at each end of the spool, the spool having reaction surfaces forming a portion of the walls of the chambers and there being appreciable leakage of oil from the pressure-oil grooves past the lands of the spool and into the chambers; the improvement which comprises: a restricted fluid passage venting each of the chambers to the return oil passage, the restricted passages being of such capacity as to maintain a pressure in said chambers substantially below operating oil pressure during operation of the valve spool and to restrict the passage of oil sufficiently to dampen oscillatory movement and prevent overtravel of the spool upon recentering.

5. In a power steering assembly including a double acting cylinder and a control valve in which a valve spool is axially movable a short distance in either direction from a central neutral position within a valve body to operate the cylinder, the spool having a series of lands and the valve body having a bore closely receiving the spool and provided with pressure oil and return oil passages and circumferential grooves coacting with the lands of the spool to direct oil under pressure selectively to one end or the other of the cylinder and to return oil from the opposite end of the cylinder, a pair of circumferential pressure-oil grooves being located one adjacent each end of the spool, and in which the valve body has a chamber at each end of the spool, the spool having reaction surfaces forming a portion of the walls of the chambers and there being appreciable leakage of oil from the pressure-oil grooves past the lands of the spool and into the chambers; the improvement which comprises: a restricted fluid passage venting each of the chambers to the return oil passage, the restricted passages being of such capacity as to maintain an equal pressure in said chambers substantially below operating oil pressure during operation of the valve spool and to restrict the passage of oil sufficiently to dampen oscillatory movement and prevent overtravel of the spool upon recentering.

6. In a power steering assembly including a double acting cylinder and a control valve in which a valve spool is axially movable a short distance in either direction from a central neutral position within a valve body to operate the cylinder, the spool having a series of lands and the valve body having a bore closely receiving the spool and provided with pressure and return oil passages and circumferential grooves coacting with the lands of the spool to direct oil under pressure selectively to one end or the other of the cylinder and to return oil from the opposite end of the cylinder, a pair of circumferential pressure-oil grooves being located one adjacent each end of the spool, and in which the valve body has a chamber at each end of the spool, the spool having reaction surfaces forming a portion of the walls of the chambers and there being appreciable leakage of oil from the pressure-oil grooves past the lands of the spool and into the chambers; the improvement which comprises: a restricted fluid passage venting each of the chambers to the return oil passage, the restricted passages being of such capacity as to maintain a pressure in said chambers substantially below operating oil pressure during operation of the valve spool and to restrict the passage of oil sufficiently to dampen oscillatory movement and prevent overtravel of the spool upon recentering.

7. A power steering control valve including housing means having a bore, a valve spool slidably disposed in said housing means bore, said housing means having a first passage communicating with said bore and adapted to be connected to a source of fluid under pressure, a second passage communicating with said bore and adapted to be connected to a fluid reservoir and third and fourth passages communicating with said bore and adapted to be connected to a fluid motor for directing fluid thereto, said spool having spaced grooves therein adapted to communicate said first and second housing means passages with said third and fourth passages so as to control fluid flow through said valve, means for damping said valve spool against vibrations and undesired movement while still permitting easy manual shifting of said valve spool, said means including portions of said housing means and of said valve spool defining opposed chambers for containing fluid which will react in opposite directions against said valve spool, passage means connecting each of said chambers to said housing means second passage in all positions of movement of said valve spool in said housing means, each of said chamber passage means including a restricted orifice to substantially restrict the flow of fluid from each of said chambers to said housing means second passage upon movement of said valve spool relative to said housing means, and actuating means movably supported on said housing means and operatively connected with said valve spool for moving the same in opposite directions and thus actuating said control valve.

8. A vehicle power steering control valve including housing means having a bore, a valve spool slidably disposed on said housing means bore, said housing means having a first passage communicating with said bore and adapted to be connected to a source of fluid under pressure, a second passage communicating with said bore and adapted to be connected to a fluid reservoir and third and fourth passages communicating with said bore and adapted to communicate with a fluid motor, said spool having spaced grooves therein adapted to communicate said first and second housing means passages with said third and fourth passages, means for damping said valve spool against vibrations and undesired movement while still permitting easy manual shifting of said valve spool, said means including portions of said housing means and of said valve spool defining opposed chambers for containing fluid which will react in opposite directions against said valve spool, passage means connecting each of said chambers to said housing means second passage in all positions of movement of said valve spool in said housing means, each of said chamber passage means including a restricted orifice to substantially restrict the flow of fluid from each of said chambers to said housing means second passage upon movement of said valve spool relative to said housing means, and an actuating member movably supported in said housing means and operatively connected with said valve spool for moving the same in opposite directions so as to actuate said control valve, said actuating means having a portion thereof extending exteriorly of said housing means, said actuating means and said valve spool being movable relative to said housing means by a force exerted on said actuating means of less than five pounds.

References Cited in the file of this patent
UNITED STATES PATENTS

| | | |
|---|---|---|
| 2,410,404 | Buchanan | Nov. 5, 1946 |
| 2,600,746 | Ernst | June 17, 1952 |
| 2,757,748 | MacDuff | Aug. 7, 1956 |
| 2,798,461 | Gold et al. | July 9, 1957 |
| 2,916,019 | Murphy | Dec. 8, 1959 |
| 2,919,681 | Schultz | Jan. 5, 1960 |